United States Patent Office 2,973,432
Patented Feb. 28, 1961

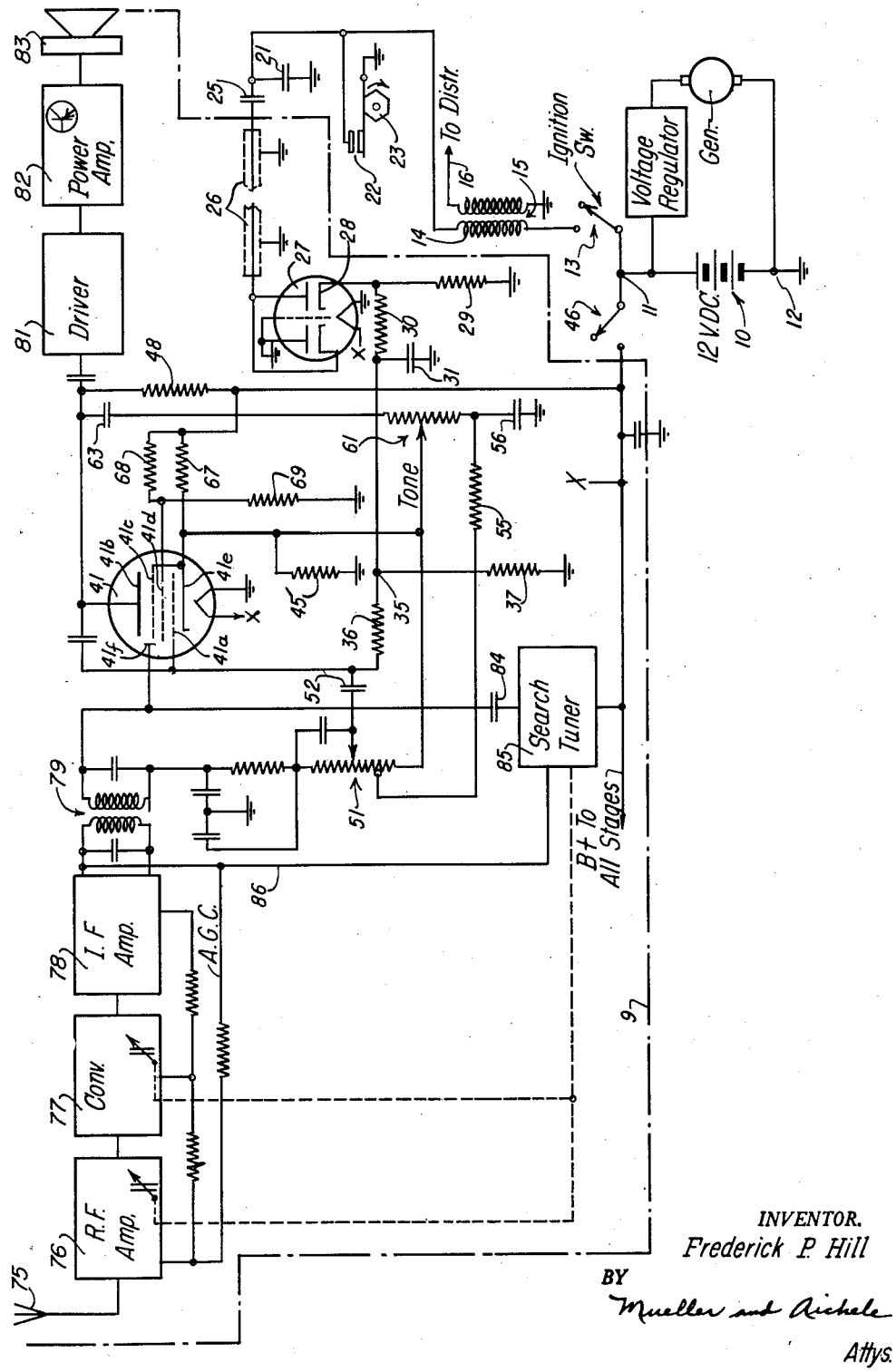

2,973,432

SPEED COMPENSATED VOLUME CONTROL

Frederick P. Hill, Elgin, Ill., assignor to Motorola, Inc., Chicago, Ill., a corporation of Illinois Filed Nov. 20, 1956, Ser. No. 623,474

2 Claims. (Cl. 250—20)

This invention relates to a volume control circuit for an automobile radio receiver, and more particularly to an automobile radio receiver in which the volume control of an audio amplifier stage therein is controlled by the speed of the automobile.

In an automobile or other mobile equipment, as the speed goes up the noise inside the automobile also usually rises so that it is desirable to raise the volume of a radio receiver in the automobile. Speed compensating circuits have been proposed but have not been used commercially. For example, it has been proposed to use a speed-compensating circuit supplied with energy from a spark plug of an automobile to raise the bias on a grid of an amplifier tube as the speed of the automobile increases. However, this circuit has many disadvantages, one being that since power is fed into the voltage controlling system thereof only once during each revolution of the automobile engine, large filtering means are required. Another disadvantage is that the system is connected to the high tension side of the ignition coil which introduces noise into the compensating circuit which in turn introduces noise into the radio circuit and is undesirable. Hitherto, there has been no simple effective compensating circuit which is capable of controlling volume of a receiver in an automobile in accordance with the speed thereof.

An object of the invention is to provide an improved speed-compensated volume control circuit for an automobile radio receiver in which motor noise is avoided.

Another object of the invention is to provide a simple speed-compensated volume control circuit for an automobile radio which requires a minimum of filtering.

A further object of the invention is to provide a speed-compensated volume control circuit for an automobile radio in which the ignition system is equally loaded and each ignition pulse is utilized to maintain a biasing voltage level.

One feature of the invention is the provision of an automobile radio circuit in which a bias voltage for one stage of the radio is derived from the primary winding of the ignition coil of the automobile so that the bias voltage varies with the speed of the automobile.

Another feature of the invention is the provision of an automobile radio receiver having bias on one of its stages derived from a voltage-doubler and a filter coupled to the primary winding of an ignition coil of the automobile so that a bias voltage proportional to the speed of the automobile is produced. Energy is derived each time the breaker points of the automobile open and close, so that a minimum of filtering is required for the output of the voltage-doubler.

Still another feature of the invention is the provision of an automobile radio circuit in which a control grid of an amplifier stage therein is biased from an isolating voltage divider supplied with power from a filter circuit in the output of a voltage-doubler coupled to a primary winding of an ignition coil of the automobile. The amplifier stage may have a cathode biased above the ground so that the grid also may be of positive potential.

Referring now to the drawing, there is shown a single figure which is a circuit diagram of an automobile radio receiver supplied with power from the battery-generator electrical source of the automobile and providing speed-compensation of the audio volume produced thereby.

The invention provides an automobile radio circuit having an audio amplifier stage including a control grid capacitively coupled to a volume control and also connected by an isolating voltage-divider to a filter circuit. The filter circuit forms the output of a voltage-doubler which is capacitively coupled to the high potential side of the breaker points of an automobile in which the radio is installed and energy is supplied to the voltage doubler from the primary winding of the ignition coil of the automobile each time the breaker points are opened and closed. Accordingly, the filter is supplied with a voltage from the voltage-doubler proportional to the speed of the automobile and the level thereof is transmitted through the isolating voltage divider directly to the signal grid of the amplifier stage. Accordingly, as the speed of the automobile increases, the voltage level of the filter system is raised and the voltage level of the control grid also is raised. Hence, the volume of the radio receiver is raised to match the added noise of the higher speed of the automobile. Since there is a voltage-doubler provided for supplying energy from the ignition system to the filter system, full wave rectification takes place and less filtering is required. Also, the load is equally distributed on the ignition system for each of the spark plugs driven by the ignition system. The filter circuit has a time constant such that the voltage level supplied by this filter circuit eliminates small variations in speed from the automobile engine.

There is shown in the drawing an automobile radio receiver which has its volume increased in proportion to the increase of speed of the automobile with which the receiver is used. The automobile includes a nominal 12-volt D.C. battery-generator power source having a positive terminal 11 and a grounded terminal 12. The positive terminal is connected by an agnition switch 13 to a primary winding 14 of an ignition coil 15 of the automobile supplying ignition power to a lead 16 to the distributor to the several spark plugs of the engine of the automobile. The automobile also includes conventional breaker points 22 driven by a cam 23 whose speed is directly proportional to the motor speeed of the automobile. A capacitor 21 is connected in parallel across the breaker points.

Whenever the points 22 are opened, a high voltage is developed across the primary winding 14 to pulse the secondary winding of the ignition coil. The primary pulse is applied through coupling capacitor 25 connected by a shielded cable 26 to the ratio circuit 9. The pulses transmitted through the coupling capacitor 25 are fed by the cable 26 to a voltage-doubling tube 27 having a cathode 28 thereof connected to ground through a voltage developing resistor 29. The operation of the voltage doubled circuit is well known. Connected to resistor 29 are a resistor 30 and a large capacitor 31 which form a filter circuit for the energy supplied thereto from the voltage-doubler tube 27. The capacitor 31 and the resistor 30 supply a predetermined voltage to a point 35 between series connected resistors 36 and 37. Resistor 37 is grounded and resistor 36 is connected directly to control grid 41a of the amplifier section of vacuum tube 41 forming the detector and first audio amplifier stage of the radio receiver circuit 9.

The radio receiver 9 includes a receiving antenna 75, a radio frequency amplifier stage 76, a converter stage 77, and an intermediate frequency amplifier stage 78 having an output transformer 79 supplying power to the detector included in the tube 41. The detector diode including cathode 41e and plate 41f develops the audio signal across volume control potentiometer 51. A resistor 55 and a capacitor 56 form a tone-compensating circuit for the volume control. Signals are applied from potentiometer 51 through coupling capacitor 52 to the grid 41d of the amplifier section of tube 41. Resistors 45, 67, 68 and 69 form voltage dividers for the screen grid 41d and the cathode 41e of audio amplifier tube 41 to hold the potential constant regardless of load. The resistors 36 and 37 bias the grid 41a with the voltage across resistor 37 being varied by the voltage applied to point 35 by the speed controlled circuit. The grid 41a is held at a potential above ground less than that of the cathode, there being, for example, a difference of 1.5 volts between the potential of grid 41a and that of cathode 41e.

The output of the stage 41 is supplied to a driver or audio amplifier driver stage 81 which supplies power to a transistor power amplifier stage 82 driving a loudspeaker 83. A capacitor 84 couples the output of the transformer 79 to a search tuner 85 of a well known type and to which is also connected the A.G.C. line 86 which supplies automatic gain control to the stages 76, 77 and 78. The tuner 85 may control variable tuning elements in stages 76 and 77.

The power supplied to the voltage-doubler tube 27 through the coupling condenser 25 is proportional to the speed of the engine of the automobile which controls the speed of the cam 23 and hence the frequency of operation of the breaker points 22. The voltage from the coil 14, which is quite high, is doubled and is applied across the resistor 29. This voltage flows through the resistor 30 into the capacitor 31, which is large, and between pulses the voltage on capacitor 31 tends to leak off through the resistors 29 and 30, which are sufficiently large that a slight lag in voltage level at the point 35 occurs during rapid acceleration or deceleration of the engine.

The time constant of the resistance-capacitance circuit is sufficiently slow that small accelerations or decelerations of speed such as occur during shifting of the gears of the automobile during which the engine speed is brought to a high value, do not appreciably affect the power level or voltage level of the filter circuit so that the volume of the radio is not appreciably affected during such operations. However, as the speed of the engine is increased and maintained at the increased speed for a longer time, as occurs in normal driving of the automobile, the voltage level at the point 35 is increased considerably over that which it is at lower speeds of the automobile, and this increases the voltage level at which the signal grid 41a is operating so that the gain of the tube 41 is increased substantially proportionally to the speed of the automobile. Similarly, as the car slowed down to a lesser speed, the speed of the cam 23 is lessened and the power delivered by the voltage-doubler circuit to the filter circuit is less so that the voltage level at the point 35 is substantially reduced and the voltage level of the signal grid 41a also is reduced, whereby the gain at the stage 41 is lessened. The stage or the tube 41 preferably is of the variable u-type and may be of the 12CR6 type.

The following circuit constants are listed solely for the purpose of illustration and are not intended to limit the invention in any way:

Resistor 29 _____ ohms__ 560
Resistor 30 _____ kilohms__ 100
Resistor 36 _____ megohms__ 4.7
Resistor 37 _____ do____ 1
Resistor 45 _____ ohms__ 500
Resistor 51 _____ megohm__ 1
Resistor 52 _____ kilohms__ 47
Resistor 55 _____ do____ 27
Resistor 67 _____ do____ 1
Resistor 68 _____ ohms__ 390
Resistor 69 _____ do____ 470
Capacitor 25 _____ microfarad__ .005
Capacitor 31 _____ do____ 10
Capacitor 52 _____ do____ .01
Capacitor 53 _____ do____ .01
Capacitor 54 _____ do____ .01
Capacitor 56 _____ do____ .02
Capacitor 63 _____ do____ .001

The volume of the above described circuit automatically changes with the changes in speed of the automobile and follows the changes in speed quite closely though not sufficiently close that changes in motor speed of short duration cause large changes in the volume. Minimum filtering is required, and since the voltage for the doubler circuit is obtained from the primary ignition coil winding, the operation of the automobile engine is not affected. The speed compensated volume control system has been found to hold the audio output of the radio receiver at a satisfactory level when driving at high speeds and when slowing down or stopping is required in normal use so that no adjustment of the receiver by the operator is required. The voltage-doubler provides sufficient voltage that the control necessary for the stage 41 is obtained.

While the above-described voltage-doubler and filtering network in the output thereof producing a control voltage from the primary of the ignition coil has been described for use with a radio, this arrangement also may be used to provide a control voltage proportional to the speed of the automobile for any purpose for which a control or indication related to the speed is wanted. For example, the control voltage so obtained may be used to control a dimmer device for providing throw or brightness of headlights of an automobile in proportion to the speed of the automobile, to increase the heating of an automobile heater as the speed of the automobile increases, to actuate a volt meter calibrated for rate of speed and to increase the volume and/or tone of an automobile horn with increase in the speed thereof.

I claim:

1. In an automobile system having a motor, a battery-generator power source provided with a positive side and a grounded side, breaker points controlled by the motor and operating at a rate related to the speed of the motor; an ignition coil having a primary winding connecting the positive side of the source to the breaker points, and a capacitor shunting the breaker points to ground, the combination therewith of a voltage-responsive device, voltage-doubler circuit means including first and second rectifier elements and having input and output terminals, a second capacitor connecting the juncture of the breaker points and the primary winding to said input terminal, a first resistor connecting said output terminal of said voltage-doubler means to ground, a second resistor having one end connected to said output terminal and a second end connected to said voltage-responsive device to apply thereto a voltage which has a value proportional to the speed of the motor, and a third capacitor coupling said second end of said second resistor to ground to form a filter therewith, said first and second resistors and said third capacitor having values selected so that the voltage across said third capacitor does not vary substantially with rapid variations in the speed of the motor.

2. In an automobile system having a motor, a battery-generator power source having a positive side and a grounded side, breaker points operating at a rate related to the speed of the motor, an ignition coil having a primary winding, a series circuit including the primary winding and the breaker points connected from the positive side of the source to ground, and a capacitor shunted across the breaker points, the combination therewith of a radio receiver having an audio amplifier stage including an electron valve having a cathode and a control grid, voltage divider means connected to said cathode and providing a positive bias potential therefor, said receiver including a volume control capacitively coupled to the control grid, voltage-doubler means including a second capacitor coupled to the juncture of the breaker points and the primary winding, a first resistor connected between the output of said voltage-doubler means and ground, a second resistor connected at one end of the juncture of said first resistor and said voltage-doubler means, a third capacitor connected between the other end of said second resistor and ground to form a filter therewith, and an isolating voltage-divider connected at one end to said control grid and at the other end to ground, said isolating voltage-divider also having an intermediate point thereon connected to the juncture of said third capacitor and said second resistor for applying at least a portion of the voltage across said third capacitor to said control grid to control the gain of said amplifier stage in proportion to the speed of the motor.

References Cited in the file of this patent

UNITED STATES PATENTS

| | | |
|---|---|---|
| 2,135,556 | Beanland | Nov. 8, 1938 |
| 2,224,678 | Hathaway | Dec. 10, 1940 |
| 2,244,066 | Jarvis | June 3, 1941 |